(12) United States Patent
Bhatia et al.

(10) Patent No.: US 9,335,963 B2
(45) Date of Patent: May 10, 2016

(54) METHOD OF MANAGING PRINT JOBS USING VIRTUAL PRINT IDENTITY

(75) Inventors: Rajesh Bhatia, Bangalore (IN); Harish B. Kamath, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 12 days.

(21) Appl. No.: 14/114,693

(22) PCT Filed: Jun. 23, 2011

(86) PCT No.: PCT/IN2011/000423
§ 371 (c)(1),
(2), (4) Date: Oct. 29, 2013

(87) PCT Pub. No.: WO2012/147089
PCT Pub. Date: Nov. 1, 2012

(65) Prior Publication Data
US 2014/0063553 A1    Mar. 6, 2014

(30) Foreign Application Priority Data
Apr. 29, 2011 (IN) .......................... 1490/CHE/2011

(51) Int. Cl.
*G06F 3/12* (2006.01)
*G06K 15/00* (2006.01)
*H04N 1/00* (2006.01)

(52) U.S. Cl.
CPC ............ *G06F 3/1296* (2013.01); *G06F 3/1204* (2013.01); *G06F 3/126* (2013.01); *G06F 3/1288* (2013.01)

(58) Field of Classification Search
CPC ... G06F 3/1288; G06F 3/1238; G06F 3/1204; G06F 3/1292; G06F 3/1287; G06F 3/1203; G06F 3/1239; G06F 3/126; G06F 3/1268; G06F 3/1285; G06F 21/10; G06F 21/31; G06F 21/51; G06F 21/62; G06F 21/629; G06F 21/82; G06F 2221/2141; G06F 2221/2149; H04N 1/00244; H04N 1/444; H04N 1/00854; H04N 1/00209; H04N 1/00212; H04N 1/00222; H04N 1/00233; H04N 1/34; H04N 1/342; H04N 1/344; H04N 1/346; H04N 1/348; H04N 1/4406
USPC ........ 358/1.1, 1.6, 1.9, 3.23, 1.13, 1.14, 1.15, 358/1.18, 402, 403; 715/750, 752; 709/208, 709/209, 219, 225, 203; 700/90, 237; 705/51, 52, 53, 54, 55, 56, 908, 909, 705/400; 399/79, 80; 707/781, 784, 694; 726/26, 4, 21, 5, 27, 28, 30
See application file for complete search history.

(56) References Cited

U.S. PATENT DOCUMENTS

| | | | |
|---|---|---|---|
| 6,337,745 B1 | 1/2002 | Aiello, Jr. et al. | |
| 6,552,813 B2 | 4/2003 | Yacoub | |
| 6,909,518 B2 | 6/2005 | Miller et al. | |
| 6,975,419 B2 | 12/2005 | Staas et al. | |
| 6,993,562 B2 * | 1/2006 | Treptow | H04L 12/58 358/3.23 |

(Continued)

FOREIGN PATENT DOCUMENTS

| | | |
|---|---|---|
| CN | 101004668 | 7/2007 |
| CN | 101237424 | 8/2008 |

(Continued)

OTHER PUBLICATIONS

"Automatic Print Email", Namtuk, 2011; http://www.automatic-print-email.com/.

(Continued)

*Primary Examiner* — Mohammad Ghayour
*Assistant Examiner* — Jonathan R Beckley
(74) *Attorney, Agent, or Firm* — Mannava & Kang, P.C.

(57) ABSTRACT

A method of managing print jobs addressed to a virtual print identity. The virtual print identity is associated with a first user, but not tied to a particular user device and the virtual print identity has at least one parameter relating to where the print job should be printed.

13 Claims, 4 Drawing Sheets

(56) References Cited

U.S. PATENT DOCUMENTS

| | | | |
|---|---|---|---|
| 7,019,861 B2 | 3/2006 | Aagesen | |
| 7,079,276 B2* | 7/2006 | Kimura | 358/1.15 |
| 7,084,997 B2 | 8/2006 | Clough | |
| 7,088,462 B2 | 8/2006 | Bhogal et al. | |
| 7,096,265 B2 | 8/2006 | Simpson et al. | |
| 7,167,264 B2* | 1/2007 | Takamiya | H04L 12/5835 358/1.15 |
| 7,187,462 B2 | 3/2007 | Oakeson et al. | |
| 7,321,437 B2 | 1/2008 | Parry | |
| 7,441,003 B1 | 10/2008 | Takeda et al. | |
| 7,474,423 B2 | 1/2009 | Garcia et al. | |
| 7,503,636 B2 | 3/2009 | Ferguson et al. | |
| 7,656,547 B2 | 2/2010 | Kuo et al. | |
| 7,746,496 B2* | 6/2010 | Henry | H04N 1/00212 358/1.15 |
| 7,760,385 B2 | 7/2010 | Yamaguchi | |
| 7,791,747 B2 | 9/2010 | Roksz | |
| 8,179,549 B1 | 5/2012 | Evans | |
| 8,195,540 B2* | 6/2012 | Henry | G06Q 10/10 705/30 |
| 8,275,100 B2* | 9/2012 | Henry | H04N 1/00212 379/100.05 |
| 8,621,549 B2* | 12/2013 | Lim | G06Q 10/10 726/1 |
| 8,773,698 B2* | 7/2014 | Oshima | G06F 3/1204 358/1.15 |
| 8,914,450 B1* | 12/2014 | Buchheit | H04L 51/00 707/784 |
| 2002/0051180 A1 | 5/2002 | Shimbori et al. | |
| 2002/0057449 A1 | 5/2002 | Chapman et al. | |
| 2003/0011801 A1 | 1/2003 | Simpson et al. | |
| 2003/0063309 A1 | 4/2003 | Parry | |
| 2003/0107762 A1 | 6/2003 | Kinoshita et al. | |
| 2003/0160977 A1 | 8/2003 | Nishikawa et al. | |
| 2004/0073574 A1 | 4/2004 | Shimizu et al. | |
| 2004/0126165 A1 | 7/2004 | Carroll | |
| 2004/0218201 A1 | 11/2004 | Lermant et al. | |
| 2004/0218213 A1* | 11/2004 | Shimizu | H04L 12/5835 358/1.15 |
| 2005/0270569 A1 | 12/2005 | Hayashi | |
| 2005/0275876 A1 | 12/2005 | McLean et al. | |
| 2006/0158681 A1 | 7/2006 | Yorimoto et al. | |
| 2006/0250631 A1 | 11/2006 | Igarashi | |
| 2006/0250638 A1 | 11/2006 | Wang et al. | |
| 2006/0265473 A1 | 11/2006 | Muto | |
| 2007/0086038 A1 | 4/2007 | Matsuzaki | |
| 2007/0146763 A1 | 6/2007 | Yokoyama | |
| 2008/0062883 A1 | 3/2008 | Shima | |
| 2008/0204793 A1* | 8/2008 | Shaw | 358/1.15 |
| 2009/0009802 A1 | 1/2009 | Shaw et al. | |
| 2009/0027700 A1 | 1/2009 | Kim et al. | |
| 2009/0172143 A1 | 7/2009 | Ishimoto | |
| 2009/0219570 A1 | 9/2009 | Fujisawa | |
| 2009/0248632 A1 | 10/2009 | Subramanian | |
| 2009/0273810 A1 | 11/2009 | Gupta et al. | |
| 2010/0020349 A1 | 1/2010 | Carroll | |
| 2010/0309510 A1 | 12/2010 | Hansen | |
| 2010/0328707 A1 | 12/2010 | Miyake | |
| 2011/0007347 A1 | 1/2011 | Kamath et al. | |
| 2011/0013219 A1 | 1/2011 | Nuggehalli et al. | |
| 2011/0063668 A1 | 3/2011 | Shirai | |
| 2011/0096354 A1* | 4/2011 | Liu | G06F 3/1204 358/1.15 |
| 2011/0145351 A1 | 6/2011 | Lee et al. | |
| 2011/0231473 A1 | 9/2011 | Narayanan et al. | |
| 2012/0057204 A1 | 3/2012 | Mizoguchi et al. | |
| 2012/0102413 A1 | 4/2012 | Gnanamoorthy | |
| 2012/0206765 A1 | 8/2012 | Nakajo | |
| 2012/0250074 A1 | 10/2012 | Kamppari et al. | |
| 2012/0250076 A1* | 10/2012 | Kumar | G06F 3/1206 358/1.15 |
| 2012/0272339 A1 | 10/2012 | Kumaravel et al. | |
| 2013/0107312 A1 | 5/2013 | Venkatesh | |
| 2013/0182281 A1 | 7/2013 | Suzuki | |
| 2013/0308165 A1* | 11/2013 | Venkatesh | G06F 3/1205 358/1.15 |
| 2013/0321855 A1 | 12/2013 | Bhatia | |

FOREIGN PATENT DOCUMENTS

| | | |
|---|---|---|
| CN | 101520829 | 9/2009 |
| JP | 2007133817 | 5/2007 |
| KR | 20060109699 | 6/2007 |
| WO | WO-0041064 A1 | 7/2000 |
| WO | WO-2012112159 A1 | 8/2012 |
| WO | WO-2012147089 A1 | 11/2012 |

OTHER PUBLICATIONS

"Cloud printing in the enterprise: Liberating the mobile print experience from cables, operating systems and physical boundaries", Hewlett-Packard Development Company, L.P., Mar. 2010.

International Search Report and Written Opinion dated Feb. 9, 2012 issued on PCT Patent Application No. PCT/IN2011/000423 filed on Jun. 23, 2011, The State Intellectual Property Office, the P.R. China.

Aranda, D.M., "Architectures for Cloud Providers Federation—Authorization of Diffusion," (Research Paper), Sep. 2011, http://eprints.ucm.es/13513/1/DanielMolina__master.pdf.

EQUITRAC, "Rules & Routing," 2010, 2 pages found at http://www.equitrac.com/downloads/5379-Rules-Routing_7-10.pdf.

Experts Exchange, "Setting up multiple printers using same IP address with different ports," Apr. 29, 2010, http://www.experts-exchange.com/OS/Microsoft_Operating_Systems/Server/2003_Server/Q_26107790.html.

Extended European Search Report received in EP Application No. 11864184, Sep. 8, 2014, 9 pages.

Google, "Printing Overview," (Web Page), 3 pages, 2012, found at http://support.google.com/chromeos/a/bin/answer.py?hl=en&topic=1329532&p=mkt_enterprise&answer=1329533.

Hewlett-Packard Company, "Print where business happens," (Research Paper), Jul. 5, 2012.

Hewlett-Packard Development Company, L.P., "HP Universal Print Driver," Solution and Feature Guide, 2009, 24 pp., http://h20331.www2.hp.com/Hpsub/downloads/UPD5_guide_final,%20web.pdf.

International Preliminary Report on Patentability received in PCT Application No. PCT/IN2011/000423, Nov. 7, 2013, 6 pages.

International Preliminary Report on Patentability received in PCT Application No. PCT/US2011/025293, Aug. 29, 2013, 6 pages.

International Search Report & Written Opinion received in PCT Application No. PCT/US2011/025293, Sep. 29, 2011, 9 pages.

PRINTECH, "Intelligent Print Job Routing," (Web Page), 2009, found at http://www.printech.com/intelligent_print_job_routing.htm.

RICOH, "doc-Q-manager, The Enterprise-wide Network Solution for Effective Print Job Management," Printing Solutions for Aficio Series, available Oct. 3, 2006 at http://www.ricoh-photocopiers.co.uk/Print_Managment/DocQManagerBro.

Schwartz, J. et al., "IBM Launches Enterprise Cloud Services," Jun. 16, 2009, 3 pages.

Silveria, L., "Itinerary not displaying in account," TripIt Help Center, Nov. 9, 2009, 2 pages, found at https://tripit.zendesk.com/entries/77324-Itinerary-not-displaying-in-account.

Trapani, G., "TripIt Organizes Your Travel Itinerary Automatically via Email," Lifehacker, Sep. 18, 2007, 3 pages, found at http://lifehacker.com/300833/tripit-organizes-your-travel-itinerary-automatically-via-email.

Wikipedia, "HP ePrint," Oct. 16, 2011, found at <https://web.archive.org/web/20111016081246/http://en.wikipedia.org/wiki/HP_ePrint>.

Wikipedia, "Posterous," Dec. 10, 2010, 3 pages, found at http://en.wikipedia.org/w/index.php?title=Posterous&oldid=401625056.

Wolber, A., "Print anywhere: Chrome, Google Apps and Cloud Print," (Web Page), Oct. 9, 2012, found at http://www.techrepublic.com/blog/google-in-the-enterprise/print-anywhere-chrome-google-apps-and-cloud-print/.

XEROX®, "Xerox® Mobile Print," (Web Page), 2011, found at http://www.office.xerox.com/software-solutions/xerox-mobile-print-solution/enus.html.

* cited by examiner

| VPI Record 400 | | | | |
|---|---|---|---|---|
| VPI ID | Rajesh@eprint.com | | | 410 |
| User Location | Home GPS xxx | | | 420 |
| Last Update Time | 7 April 2011   18:54 | | | 430 |
| Rules | Graphic ⟶ Printer 1 | | | 440 |
| | 6:00pm – 8:00am ⟶ Printer 2 | | | 450 |
| | 8:01am – 5:59pm ⟶ Printer 3 | | | 460 |
| Printer Name | Printer Address | Printer Location | Printer Type | |
| Printer 1 | Office1@eprint.com | Office GPS xxx | Graphic | 465 |
| Printer 2 | Office2@eprint.com | Office GPS xxx | B&W | 470 |
| Printer 3 | homeprinter@remoteprint.com | Home GPS xxx | B&W | 475 |

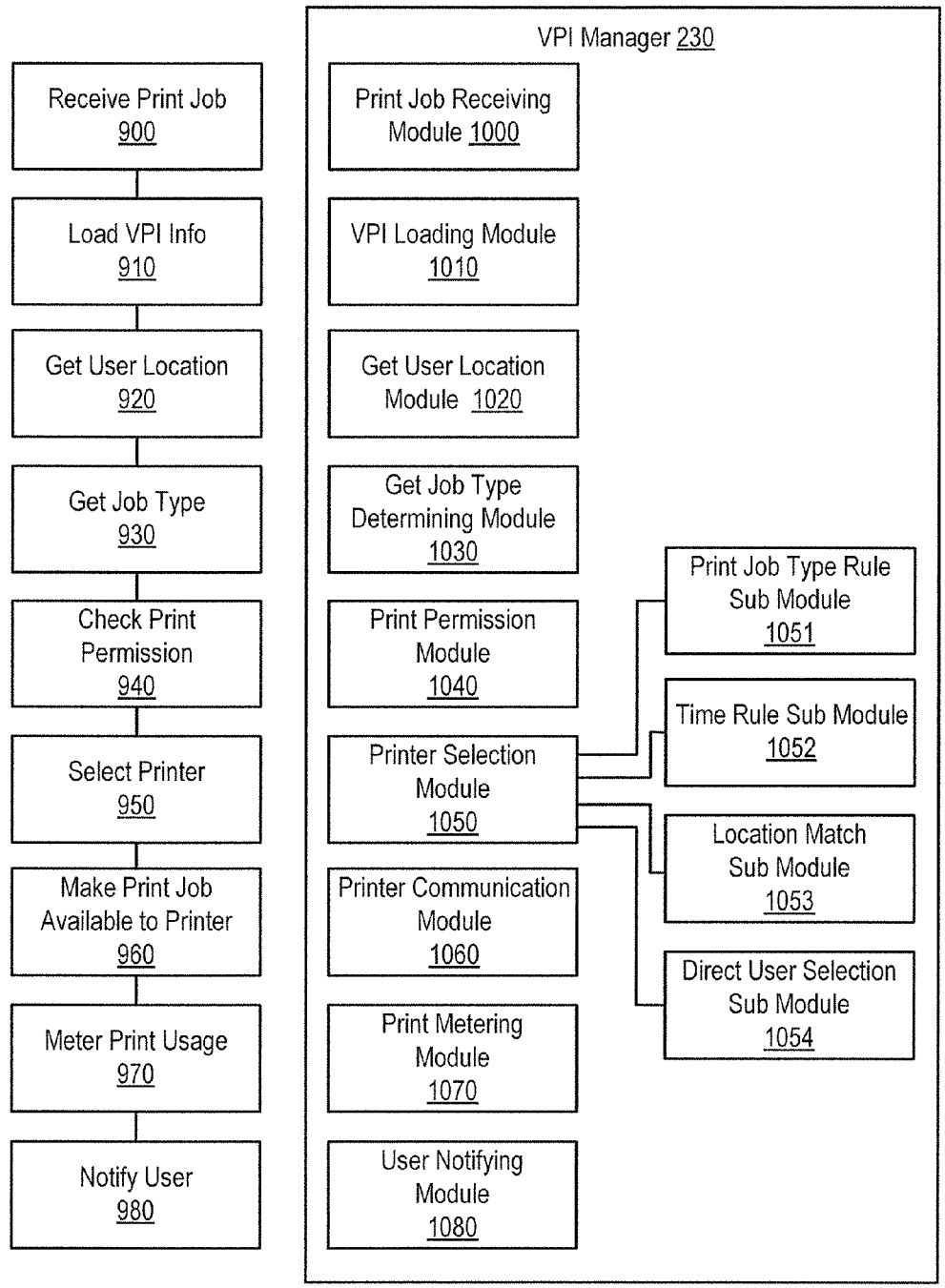
*Fig. 6*      *Fig. 8*

METHOD OF MANAGING PRINT JOBS USING VIRTUAL PRINT IDENTITY

CLAIM FOR PRIORITY

The present application is a national stage filing under 35 U.S.C 371 of PCT application number PCT/IN2011/000423, having an international filing date of Jun. 23, 2011, which claims priority to Indian patent application 1490/CHE/2011, filed on Apr. 29, 2011, the disclosures of which are hereby incorporated by reference in its entirety.

BACKGROUND OF THE INVENTION

In an office, a user typically sends a print job directly to a printer connected to his computer or to a networked printer over the office LAN. A recent development is the introduction of 'e-print enabled' printers which have an email address and which can receive and process a print job sent to their email address.

BRIEF DESCRIPTION OF THE DRAWINGS

Some examples are described below with reference to the following figures in which:

FIG. 6 is a flow chart showing one example of a method of managing print jobs;

FIG. 8 shows an example of modules which a virtual print identity manager may have.

DETAILED DESCRIPTION

In the context of this specification, a "print job" is an instruction to print text and/or an image. It applies to any text or images which can be printed, including but not limited to word processed documents, pdf files, graphics, photographs, spreadsheets, text documents, presentations, payslips, faxes etc. A "printer" is an electronic device that performs printing and/or copying functions. It includes devices which are dedicated to printing, but also includes devices, such as scanners, copiers, machines with facsimile operations, and/or multifunctional devices that perform several functions such as printing, scanning, copying, and faxing.

In a typical office a user selects a specific printer to which a print job is to be sent using an application or operating system on his computer. The print job is then addressed to that specific printer and sent over the LAN either directly to the printer or to a print server which then directs the print job to the specific printer identified by the user in the print instruction. In e-print systems a user can send a print job to a specific 'e-print enabled' printer by emailing the print job to an email address of that specific printer. The email is typically received by an email server and then downloaded from the server by the printer having that email address.

However, as workers become increasing mobile they may no longer work from only a single office and may travel to different locations. Further, long work hours and 'flexible' working arrangements mean that some employees will work from both the office and their home.

Figure 1:
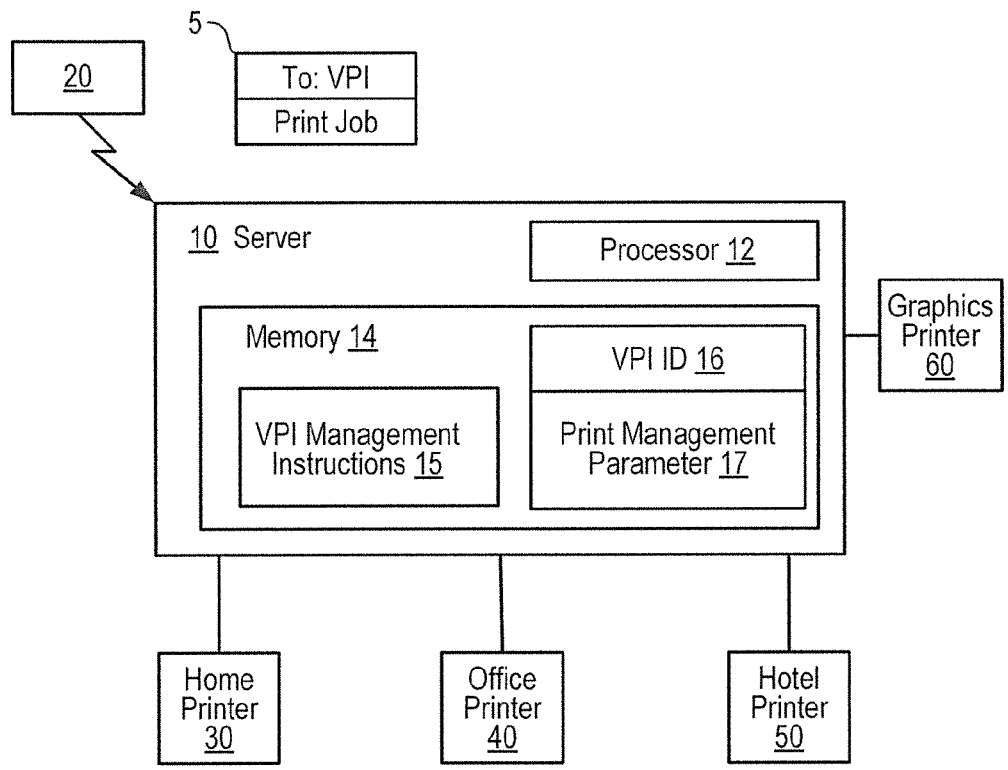
FIG. 1 is a schematic diagram showing an example of a user device, a server and printers on which a print job may be printed.

FIG. 1 is a schematic diagram in which a first user sends a print job 5 from his user device 20 (e.g. his personal computer, laptop, mobile phone etc) to a server 10. The print job may have a 'from address' and a 'to address'; in which case the 'from address' would typically be the address of the device sending the instruction (or the email address of the sender if the print job is sent by email) and the 'to address' would be the virtual print identity to which the print job is addressed. The print job 5 is addressed not to a specific physical printer, but rather to a 'virtual print identity' (VPI) which is associated with the first user. A 'virtual print identity' is an identity managed by a server, associated with a user and having a primary function of managing print jobs for said user. The virtual print identity is independent of the user device from which the print job is sent, i.e. whether the print job is sent from the first user's mobile phone, from a desktop PC at the office or a laptop at home, the virtual print identity to which the print job is sent remains the same. In one example, the virtual print identity has an email address, e.g. rajesh@eprint.com and the print job is sent by email. The email sending the print job may comprise an attachment containing the print job and instructions for printing the print job. The instructions may be in the body of the email and may comprise print formatting instructions.

The server 10 is able to communicate with several printers including a home printer 30 at the user's home, a black and white office printer 40 at the user's main office, a hotel printer 50 and a graphics printer 60 at the user's main office. Each printer has its own address. In this example each printer is an e-print enabled printer having its own email address, but in other examples some or all of the printers may not be email enabled printers, but rather conventional printers with a network address accessible via a LAN.

The server 10 has a memory 14 containing machine readable instructions 15 and a processor 12 for executing said instructions. The instructions act as a virtual print identity manager. By executing the machine readable instructions, the server is capable of selecting which printer to print the print job on based on one or more parameters of the virtual print identity (VPI). The one or more parameters may be stored on the memory 14 of the server, or in an external memory accessible by the server. In the example of FIG. 1 a virtual print identity ID 16 and associated print management parameter 17 are stored in the memory 14.

The one or more parameters may comprise user location and/or one or more rules or user preferences for determining where the print job is printed. In one example, the virtual print identity indicates the location of the user and this user location information can be thought of as a 'parameter' relating to where the print job should be printed. If the user is travelling and the virtual print identity indicates that the user is currently staying at a hotel, then the print job may be sent to the hotel printer 50 for instance. Other parameters relating to where the print job should be printed may comprise print job type or time based rules. For example, if the print job contains graphics, it is sent to the graphics printer 60, or if the print job does not contain graphics it is sent to the office printer from 8 am to 6 pm and the home printer from 6.01 pm until 7.59 am.

As the virtual print identity is not tied to any specific user device or any specific physical printer, it is very simple to send a print job to a printer preferred by the user. The print job can simply be addressed to the virtual print identity associated with the user and the server will select the appropriate printer. In this way the selected printer is independent of the actual device which sent the print job and determined instead by one or more parameters of the virtual print identity to which the print job was addressed.

While in the above example the print job was sent by the first user, in other examples the print job could be sent by a third party (e.g. a second user such as a secretary). So, for example, a second user working in Bangalore, could send a print job to a virtual print identity associated with a first user who is currently located in Hong Kong. The server then selects a printer close to the first user in Hong Kong. In another example, the third party could be a subscription service, e.g. a service for regularly sending a newspaper, or other periodical, as a print job to the first user. The third party may send the print job by email or by another network protocol, e.g. by a print application on a user device of a second user or an application belonging to the subscription service provider.

Figure 2:
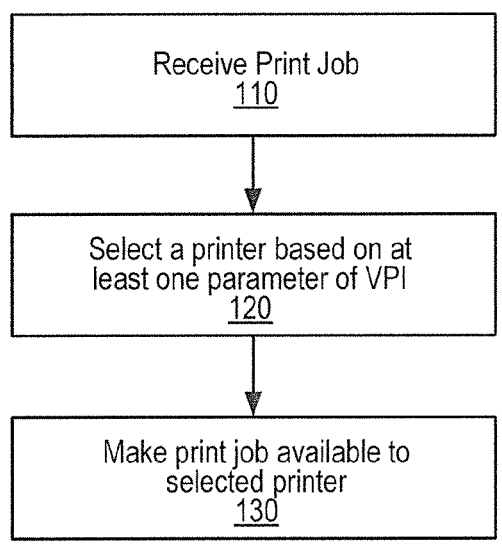
FIG. 2 is a flow chart showing one example of processes performed by the server.

FIG. 2 is a simple flow diagram showing the main processes carried out by the server 10. At 110 the server receives a print job addressed to a virtual print identity handled by the server. At 120 the server selects a printer based on one or more parameters of the virtual print identity. At 130 the server makes the print job available to the selected printer. For example the server may make the print job available by actively sending the print job to the selected printer, sending the print job to a memory accessible to the selected printer, or by notifying the selected printer of the location of the print job (e.g. a location in a memory of the server) so that the printer can read the contents of the print job at its own pace.

Figures 3, 4:
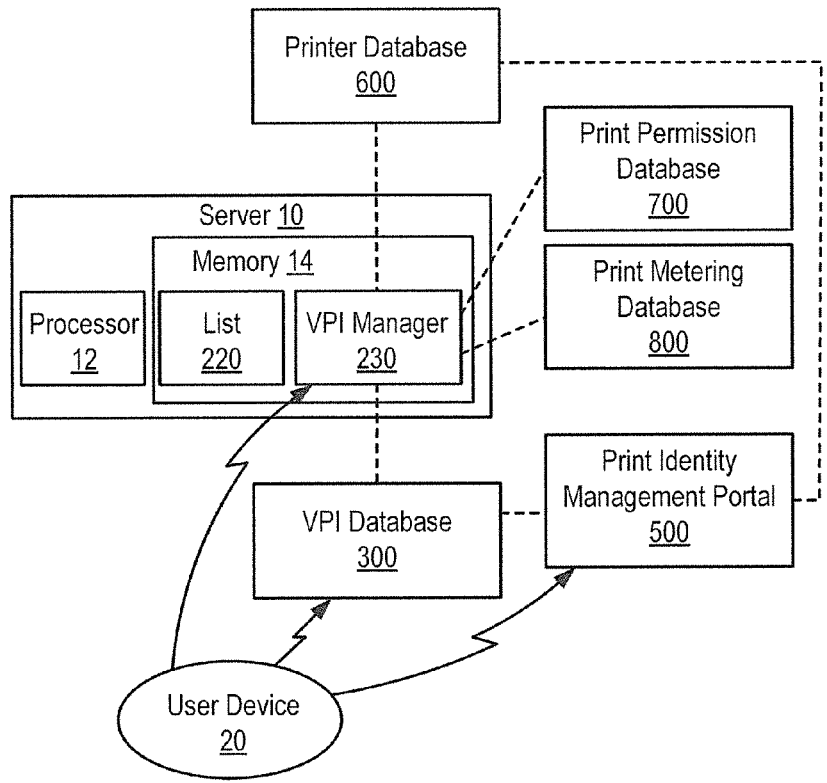
FIG. 3 shows one example of a system comprising a server and various databases.
FIG. 4 shows one example of a record in a virtual print identity database.

FIG. 3 shows an example of an e-print system in more detail. There is a server 10, a virtual print identity database 300, a print identity management portal 500, a printer database 600, a print permissions database 700 and a print metering database 800. A user device 20 is able to connect to the server 10, the print identity management portal 500 and/or the virtual print identity database 300.

The server 10 has a processor 12 and a memory 14. The memory 14 stores a list 220 of virtual print identities managed by the server and a virtual print identity manager 230. The virtual print identity manager 230 may be implemented by a set of machine readable instructions which are executable by the processor. Upon receiving a print job addressed to a virtual print identity handled by the server, the virtual print identity manager 230 selects a printer, based on one or more parameters of the virtual print identity, and makes the print job available to that printer as described above in FIG. 2.

In the example shown in FIG. 3, the one or more parameters are stored in a virtual print identity database 300 external to the server 10. However, in other examples the virtual print identity database 300 may reside in a memory of the server 10. The virtual print identity database 300 comprises a set of records. Each record corresponds to a virtual print identity and contains one or more parameters relating to management of print jobs for that virtual print identity.

The print permissions database 700 comprises a list of virtual print identities and print permissions associated with the virtual print identities. When the server receives a print job of a type which is restricted (e.g. only available to certain people or paying subscribers), the VPI manager 230 consults the print permissions database 700 to check that the virtual print identity has permission to print the print job. If the virtual print identity has permission then the VPI manager proceeds to select an appropriate printer as described in FIG. 2, otherwise the person sending the print job is informed that the VPI does not have permission to print the print job.

The print metering database 800 comprises usage data for a plurality of virtual print identities. It communicates with the VPI manager and meters the print usage of each virtual print identity. This information may be used for billing purposes or to impose print quotas for example.

The print identity management portal 500 and printer database 600 will be described later, but first the virtual print identity database 300 will be described in more detail.

There are various ways of organizing information into a record in the virtual print identity database and various types of data may be included. FIG. 4 gives one example. The record 400 comprises an identifier of the virtual print identity 410 (for example an email address or other unique identifier) and user location information 420 indicating the location of the user associated with the virtual print identity. The record may also contain a last update time 430, indicating the time that the record was last updated. This enables the virtual print identity manager to determine whether or not the user location information is current or needs to be updated. The record may further comprise one or more entries relating to rules or user preferences for determining which printer should be used under particular circumstances. In the illustrated example entry 440 indicates that the color printer should be used for graphics, entry 450 indicates that the closest printer should be used from 8.00 am to 6.00 pm and entry 460 indicates that the home printer should be used from 6.01 pm to 7.59 am. In general terms each of the user location data and the rules or user preferences may be thought of as a 'parameter' of the virtual print identity which relates to where a print job should be printed.

The record 400 may further comprise an entry for each printer associated with the virtual print identity (in the illustrated example entries 465, 470 and 475 each relate to a respective printer). Each such printer entry comprises information relating to the printer, for instance the printer address (which in this example is an email address, but may alternatively be a network address, IP address or other information enabling communication with the printer), the printer's location, the type of printer etc. By inspecting the printer location information and comparing to the user location information, the virtual print identity manager can select the closest printer to the user.

The information in the virtual print identity record may be filled and updated by various methods. One way is for the user to enter some, or all, of the data through a print identity management portal 500 shown in FIG. 3. The print identity management portal 500, also known as an 'ePrint Centre', provides the user with an easy way to manage their virtual print identity through a user interface. The ePrint Centre may, for example, be a website or a server accessible through an application running on a user's client device (for example a mobile phone application). The user may enter their current location, one or more preferred printers and/or rules for determining which printer to use via the ePrint Centre.

Figure 5:
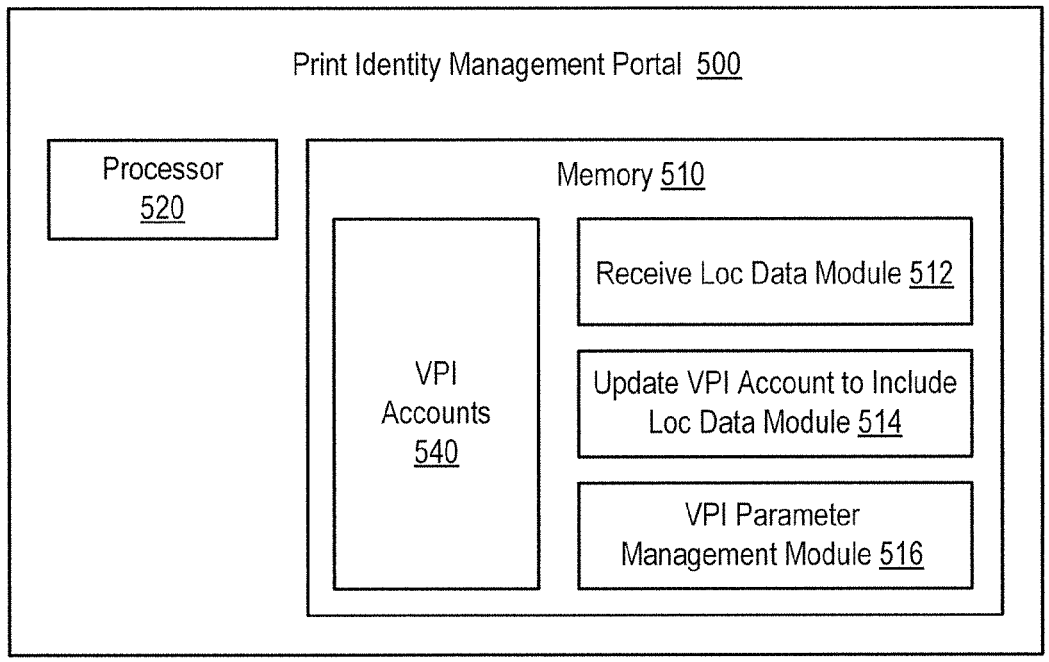
FIG. 5 shows one example of a print identity management portal.

An example of an ePrint Centre is shown in more detail in FIG. 5. It comprises a memory 510 and a processor 520. The memory stores a set of machine readable instructions executable by the processor 510. The machine readable instructions include a module 512 comprising instructions for receiving location data of the user; a module 514 comprising instructions for updating the virtual print identity account of the user to include said location data and a module 516 for managing one or more rules defining which printers are to be used for printing print jobs sent to the virtual print identity. The user may input new rules or modify or delete existing rules by logging into the ePrint Centre.

In the illustrated example, the memory 510 of the ePrint Centre stores the virtual print identity accounts 540. Each virtual print identity account may comprise a table listing printers currently associated with that virtual print identity and rules indicating which printers are to be used to print a print job sent to said virtual print identity. The information in the user account may be sent to the virtual print identity database 300 and/or server 10 proactively (e.g. periodically or each time the account is updated) or on request. In an alternative arrangement the virtual print identity accounts may not be stored locally on the ePrint Centre, but the ePrint Centre may instead simply transmit data to and retrieve data from the virtual print identity database 300.

Another way to update the information in a virtual print identity record is for a user's device to dynamically update the user location by sending updates to the virtual print identity database. For example, the user location may be synched periodically or when a print job is instructed. The user location may for example be detected by GPS, from the IP or network address of the user device, or by location information derived from the telecommunications network used by the user device. In another example the user location may be determined from a diary of the user stored on the user device or a diary stored elsewhere in a computer network.

If it is detected that a user has moved to a significantly different location (e.g. to another city), then the virtual print identity manager, ePrint Centre or user device may search for printers in the new location to be associated with the virtual print identity. The virtual print identity record may then be updated. In one example the user is given a list of printers in the new location and asked to select one or more to associate with the virtual print identity. Where user input is required this may be handled by an application on the user device. Printers in the new location may found by referring to a printer database 600 such as that shown in FIG. 3. The printer database 600 comprises a plurality of printer records and each printer record may comprise information such as the printer name, printer address, printer location and printer type etc. Further the user device may search any network to which it is currently connected to detect printers to be added to the printer database.

FIG. 6 is a flow chart showing an example of a method of managing print jobs for a virtual print identity which may be performed by a virtual print identity manager (VPI manager) on a server. The virtual print manager may be stored as a set of machine readable instructions in the memory of the server which are executable by a processor of the server.

At 900 the virtual print identity manager receives a print job addressed to a virtual print identity handled by the server. At 910 the VPI manager checks if it has up to date information relating to the virtual print identity, if not then information (e.g. the VPI record) is retrieved from the virtual print identity database 300. At 920 the VPI manager checks the location of the user associated with the virtual print identity, e.g. it may retrieve the location data from the VPI record, retrieve information by GPS or the telecommunications network or query the user device.

At 930 the VPI manager determines the type of print job, e.g. whether the print job is a work or personal print job (which may be relevant for billing purposes), or whether the print job is primarily composed of graphics or text (which may be relevant for selecting which printer to use). This may be done automatically by examining the content or title of the print job or by querying the user for example.

At 940 the VPI manager checks if the print job is a print job which requires a print permission. If it is a print job which requires a print permission then the VPI manager contacts the print permission database to check whether the virtual print identity has permission to print the print job. If the VPI has permission then the process continues to 950, otherwise the person who sent the print job is informed that the virtual print identity does not have permission to print the print job.

At 950 the VPI manager selects a printer on which to print the print job based on parameters of the virtual print identity. One example of a process for selecting a printer is given in FIG. 7 which is described later.

At 960 the VPI manager makes the print job available to the selected printer. This may for instance be done by actively sending the print job to the selected printer, sending the print job to a memory accessible to the selected printer, or by notifying the selected printer of the location of the print job (e.g. a location in a memory of the server) so that the printer can read the contents of the print job at its own pace.

At 970 the VPI manager sends usage information to the print metering database 800. The usage account of the virtual print identity is thus updated. For example the VPI manager may count the number of pages printed and send this information to the usage database together with information indicating whether the print job was a personal print job or work print job. The print location and any other relevant information may also be logged. The print metering database may later be used to generate billing information for billing the user associated with the virtual print identity.

At 980 the user who owns the virtual print identity is notified that the print job has been printed. The notification may also inform the user which printer the print job was printed on. The notification may for example be sent by email to an email address of the user. The email address of the user will in most cases be distinct from any email address belonging to the virtual print identity. E.g. if the user is Rajesh then the virtual print identity email address may be rajesh@eprint.com and Rajesh's email address may be rajesh@hp.com.

Figure 7:
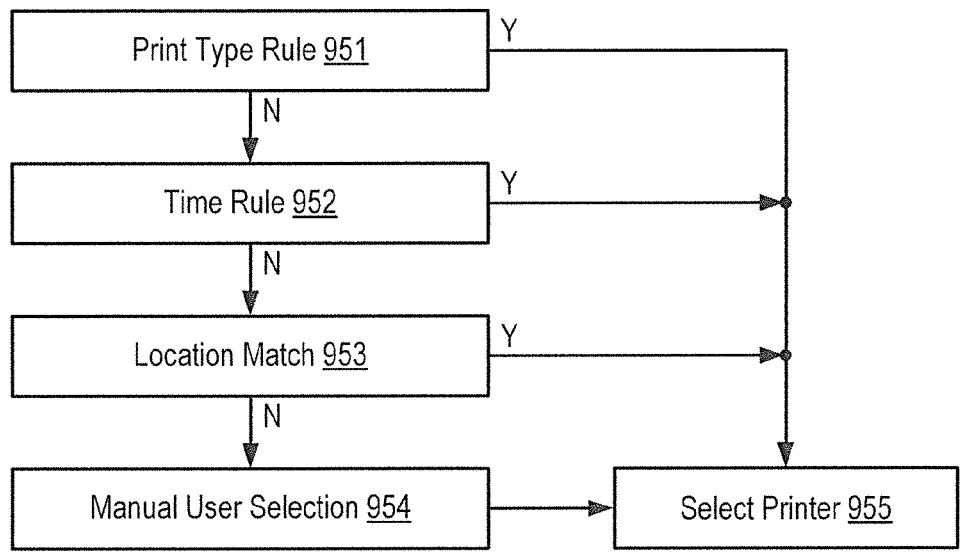
FIG. 7 is a flow chart showing one example of a method of selecting a printer on which to print a print job sent to a virtual print identity.

FIG. 7 is a flow chart showing an example process for selecting a printer. The process may be executed by the virtual print identity manager running on the processer of the server. At 951 the VPI manager checks if the VPI parameters include a rule for directing particular types of print job to a specific printer. If so and if the print job is of that type, then that printer is selected. Otherwise at 952 the VPI manager checks if the VPI parameters include a rule for sending print jobs to a particular printer at certain times of day, if so and if the current time is that time of day, then the appropriate printer is selected. Otherwise at 953 the VPI manager attempts to find a printer which matches the current location of the user associated with the VPI. The VPI manager may for example search the printer database 600 to find a printer in the same location as the user. If there are several printers in the same location, then a printer may be selected based on a user preference or other VPI parameters. In some cases if there are several possible printers in a suitable location, the selection may be based on printer status and which printers are currently available. If no printer can be matched then at 954 the user is informed by sending a message to their user device and the user is requested to select and/or find a printer.

FIG. 8 is a detailed example of a possible structure of the VPI manager showing modules for executing the methods described in FIGS. 6 and 7. Specifically there is a print job receiving module 1000, a VPI loading module 1010, a get location module 1020, a job type determining module 1030, a print permission module 1040, a printer selection module 1050, a printer communication module 1060 which makes the print job available to the selected printer, a print metering module 1070 and a user notifying module 1080. The printer selecting module 1050 may have various sub modules such as a print job type rule module 1051, a time rule module 1052, a location match module 1053 and a direct user selection module 1054. These modules perform the processes described in the corresponding boxes in FIGS. 6 and 7.

The modules and machine readable instructions described above are typically embodied as a set of executable instructions which are effected on a machine (e.g. a computer, server or microchip) which is programmed with and controlled by said executable instructions. Such instructions may be loaded for execution on a processor (such as one or more CPUs). The term 'processor' includes microprocessors, microcontrollers, processor modules or subsystems (including one or more microprocessors or microcontrollers), or other control or computing devices. A "processor" can refer to a single component or to plural components In some examples, the methods illustrated herein and data and instructions associated therewith are stored in respective storage devices, which are implemented as one or more non-transitory computer-readable or computer-usable storage media or mediums. The storage media may include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the machine readable instructions discussed above can be provided on one non-transitory computer-readable or computer-usable storage medium, or alternatively, can be provided on multiple non-transitory computer-readable or computer-usable storage media distributed in a large system having possibly plural nodes. Such non-transitory computer-readable or computer-usable storage medium or media is (are) considered to be part of an article (or article of manufacture). An article or article of manufacture can refer to any manufactured single component or multiple components.

While certain specific examples have been given above it is understood that variations could be made by a person skilled in the art while keeping within the general spirit and purpose of the above examples. For example rather than having a rule to determine printer selection directly by time of day, the virtual print identity manager could refer to a diary associated with the virtual print identity and the diary could indicate the user location at particular times of day. A printer could then be selected on a location basis. Further while FIG. 3 shows a distributed system with the server and various databases hosted separately, it would be possible for some or all of these to be combined such that they are hosted at the same location or as part of the same server or apparatus.

What is claimed is:

1. A method of managing print jobs on a server having a memory and a processor, the method comprising:
   the server receiving by email a print job addressed to an identifier of a virtual print identity account, wherein the virtual print identity account is an account associated with a first user, but not tied to a particular user device, the virtual print identity account having at least one parameter relating to where a print job should be printed;
   determining a type of document in the print job;
   determining whether the type of document in the print job is a restricted type of document that is allowed to be printed only by paying users;
   determining whether the virtual print identity account has a permission to print the document in the print job based on the type of the document and whether the first user is a paying user;
   in response to a determination that the virtual print identity account has the permission to print the document, selecting a printer to print the print job based on the at least one parameter in the virtual print identity account; and
   making the print job available to the selected printer.

2. The method of claim 1, wherein the at least one parameter is a location of the first user.

3. The method of claim 1, further comprising metering print jobs printed by said virtual print identity account against a usage account.

4. The method of claim 1 wherein one or more parameters relating to the virtual print identity account are stored in a database.

5. The method of claim 4 wherein the database has rules for sending the print job to different printers at different times of day.

6. The method of claim 4 wherein the server determines a type of print job and selects the printer based on a rule in the database indicating a particular printer is to be used for a particular type of print job for that virtual print identity account.

7. The method of claim 1 wherein the email received by the server comprises instructions relating to printing of the print job and an attachment containing the print job.

8. The method of claim 1, further comprising sending an email to the selected printer to make the print job available to said selected printer.

9. A method of managing print jobs on a server having a memory and a processor, the method comprising:
   the server receiving a print job from a third party, said print job being addressed to an identifier of a virtual print identity account, wherein the virtual print identity account is an account associated with a first user, said virtual print identity account not being tied to a particular user device and having at least one rule relating to where a print job should be printed;
   determining a type of document in the print job;
   determining whether the type of document in the print job is a restricted type of document that is allowed to be printed only by paying users;
   determining whether the virtual print identity account has a permission to print the document in the print job based on the type of the document and whether the first user is a paying user;
   in response to a determination that the virtual print identity account has the permission to print the document, selecting a printer on which to print the print job based on the at least one rule in the virtual print identity account; and
   making the print job available to the selected printer.

10. The method of claim 9, wherein said at least one rule refers to a location of the first user or a time of day.

11. The method of claim 9, further comprising selecting, by the server, a printer that is in physical proximity to the first user to print the print job.

12. A server comprising:
    a processor, and
    a memory having a list of virtual print identity accounts handled by the server, wherein each virtual print identity account is an account associated with a user, but not tied to a particular user device, the memory further comprising a set of machine readable instructions executable by the processor to:

receive by email, a print job addressed to an identifier of a virtual print identity account of the virtual print identity accounts handled by the server;

determine a type of document in the print job;

determine whether the type of document in the print job is a restricted type of document that is allowed to be printed only by paying users;

determine whether the virtual print identity account has a permission to print the document in the print job based on the type of the document and whether the user of the virtual print identity account is a paying user;

in response to a determination that the virtual print identity account has the permission to print the document of the print job, select a printer on which to print said print job based on at least one parameter of said virtual print identity account; and make said print job available to said selected printer.

13. The server according to claim 12, wherein the server comprises a virtual print identity database to store the at least one parameter of the virtual print identity account.

\* \* \* \* \*